United States Patent [19]
Bayless et al.

[11] 4,163,151
[45] Jul. 31, 1979

[54] SEPARATED ION SOURCE

[75] Inventors: John R. Bayless, Malibu; Robert L. Seliger, Agoura; James W. Ward, Canoga Park; James E. Wood, Newbury Park, all of Calif.

[73] Assignee: Hughes Aircraft Company, Culver City, Calif.

[21] Appl. No.: 865,280

[22] Filed: Dec. 28, 1977

[51] Int. Cl.² .................. B01D 59/44; H01J 39/34
[52] U.S. Cl. ............................. 250/296; 250/281; 250/423 R
[58] Field of Search ............... 250/281, 282, 283, 284, 250/290, 291, 296, 423 R, 427

[56] References Cited
U.S. PATENT DOCUMENTS

| 2,782,337 | 2/1957 | Robinson | 250/423 |
| 3,423,584 | 1/1969 | Erickson | 250/290 |
| 3,955,091 | 5/1976 | Robinson et al. | 250/423 |

*Primary Examiner*—Bruce C. Anderson
*Attorney, Agent, or Firm*—Allen A. Dicke, Jr.; W. H. MacAllister

[57] ABSTRACT

The separated ion source combines an ion source and a magnetic mass separator within a single magnetic field geometry. The preferred ion source has a low voltage Penning discharge configuration and produces a charged particle beam in the form of a ribbon with a rectangular cross section.

3 Claims, 4 Drawing Figures

SEPARATED ION SOURCE

BACKGROUND OF THE INVENTION

This invention is directed to a separated ion source which has geometry which employs the same magnetic field source for both ion production and ion separation.

Prior structures were comprised of separate functional components which were connected together to form the ion beam line. An ion source was used and it had its own magnetic field structure if such was required for the production of the ion beam. Ion separation downstream from the ion source required additional separation components. Due to the separate-element approach to the problems, such a structure is unnecessarily long and complex. These disadvantages are particularly bad in the case of high current low energy beams because severe space charge expansion occurs in the region between the ion source and separator. Attempts to locate the separator just downstream of the ion source were unsuccessful because the magnetic fields interferred. That is, the axial magnetic field in the ion source was disturbed by the transverse magnetic field of the separator.

SUMMARY

The substance of this invention is a highly integrated structure that was designed specifically to provide the two functions ion generation and ion separation in direct succession. Thus, space charge and interface problems between the source and separator are minimized. Furthermore, the ion source produces a ribbon beam with a rectangular cross section which reduces the effects of space charge and enables mass separation to occur in a relatively weak magnetic field.

It is thus an object of this invention to provide a structure which comprises a separated ion source which has both the ion production structure and the ion separation structure therein.

It is a further object to provide a separated ion source wherein a single magnetic field means acts on both the ion production and the ion separation portions of the separated ion source.

It is a further object to provide an ion source which requires a magnetic field for the production of ions in direct connection with an ion separator which requires a magnetic field and to employ a single magnetic field structure which satisfies both magnetic field requirements.

Other objects and advantages of this invention will become apparent from a study of the following portion of the specification, the claims and the attached drawings.

DESCRIPTION OF THE PREFERRED EMBODIMENTS

Figure 1:
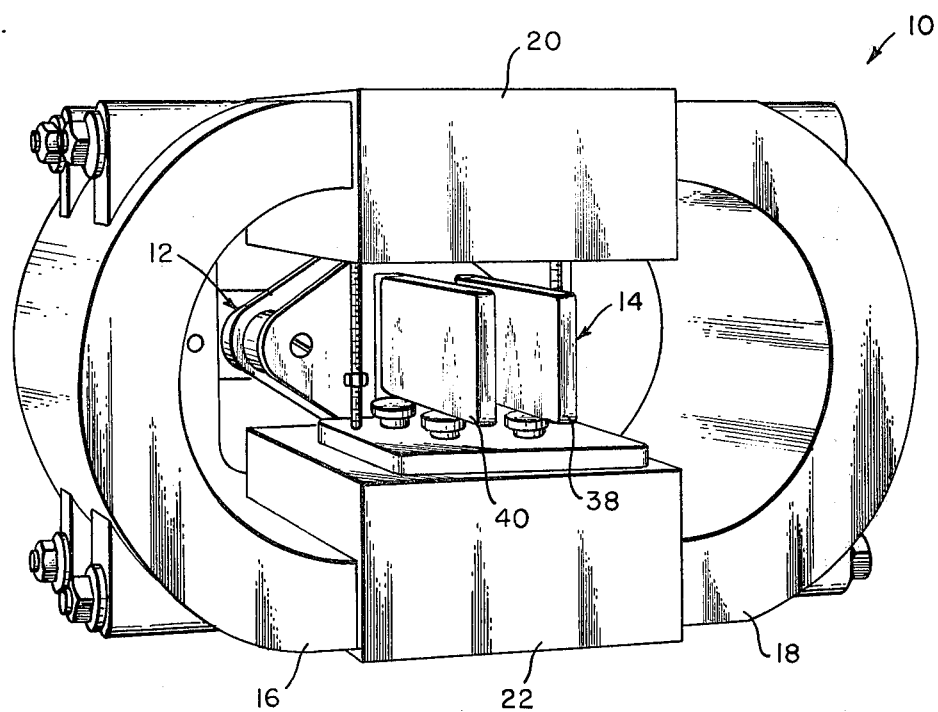
FIG. 1 is a perspective view of the separated ion source of this invention.
Figure 2:
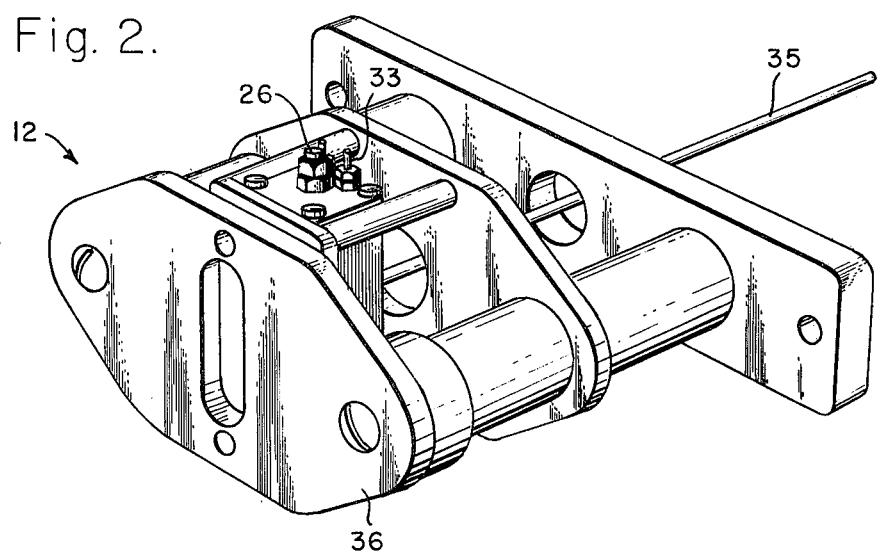
FIG. 2 is an enlarged perspective of the ion source portion of the separated ion source equipment of this invention.
Figure 3:
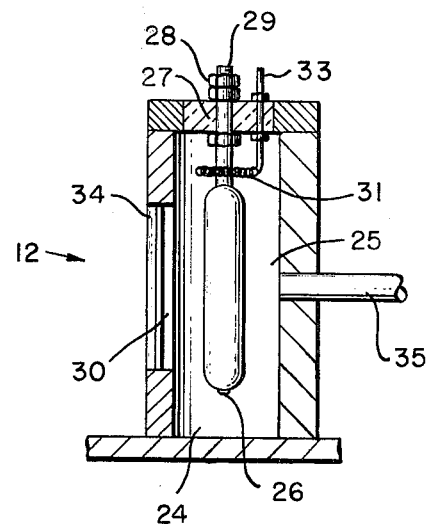
FIG. 3 is a vertical section through a portion of the ion source.
Figure 4:
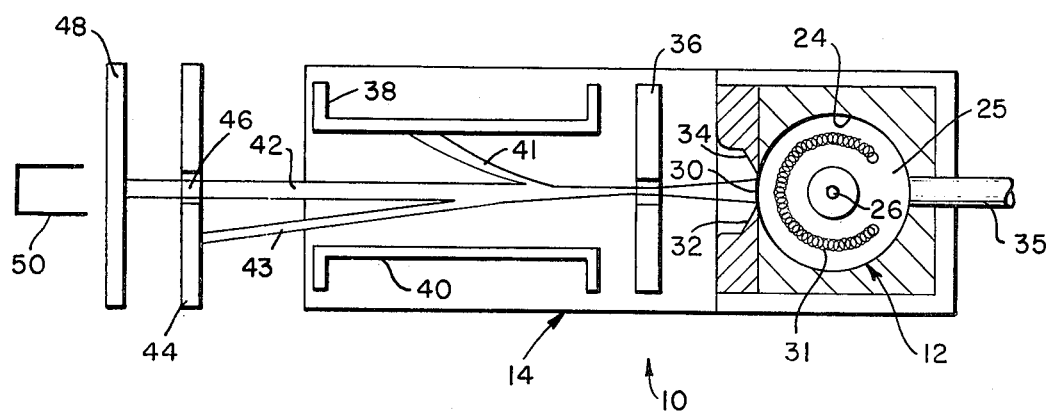
FIG. 4 is a schematic horizontal section through the separated ion source showing the interrelated components.

The separated ion source of this invention is generally indicated at 10 and FIGS. 1 and 4. It comprises ion source 12, which is seen in FIGS. 2, 3, and 4 and ion separator 14 which is seen in FIGS. 1 and 4. Magnets 16 and 18, see FIG. 1, connected to pole pieces 20 and 22, provide a magnetic field across both the ion source and the ion separator.

Ion source 12 has a Penning discharge type configuration. The cathode 24 has an interior cylindrical cathode surface. Anode 26 is positioned within the cathode and is electrically insulated therefrom by means of insulator 27 in the top cover 28. Anode 26 extends through the top-cover insulator 27 to provide a terminal 29 to which the anode voltage is applied. Hot filament 31 is positioned adjacent the anode and has terminals 33 for hot filament energization which also extend from the cathode space through the top cover. The gas to be ionized is introduced into the discharge chamber 25 by means of a feed tube 35. The radii of the anode and cathode surfaces, the gas pressure and the magnetic field strength in the interelectrode spaces are such that a Penning low pressure glow discharge is formed. The Penning discharge causes ionization and it is from this discharge plasma that the ions are extracted.

The magnetic field is supplied in a direction parallel to the anode and has a value of about 1100 gauss at the center of the ion source. In the presence of the gas to be ionized, with a pressure in the discharge chamber in the order of about 100 microns, a Penning discharge is sustained in discharge chamber 25 between the anode and cathode with a voltage of 100 to 150 volts. Electrons, which ionize the gas molecules, are provided by hot filament 31. The magnetic field causes the path length of electrons travelling between the cathode and the anode to be much greater than their separation. This increases the probability of ionization and in turn results in a gas consumption which is less than one tenth the gas consumption required without a magnetic field. After ignition, the discharge operates at a voltage in the range of 75 to 125 volts and at a discharge current of 100 to 1000 milliamperes. The discharge is very stable and since the discharge voltage is lower than for most types of cold cathode discharge, sputtering is less of a problem.

Ions are extracted from the discharge through a high aspect ratio slit 30 in the discharge chamber 25. The slit 30 has a rectangular cross section whose long dimension is shown in FIG. 3 and whose narrow dimension is shown in FIG. 4. The extraction geometry is based on the design criteria developed by J. R. Pierce. Electrodes 32 and 34 adjacent the slit are Pierce-type electrodes to prevent space charge effects from spreading the beam. Furthermore, the strip beam geometry of high aspect ratio which is typically 50 times higher than its width, reduces space charge effects and it is compatible with the separator geometry. Accelerator electrode 36 is positioned adjacent the ion extraction opening and accelerates the ion beam into the ion separator.

Ion separator 14 comprises separator plates 38 and 40 which are positioned in the magnetic field and oriented parallel to the ribbon beam. A power supply applies a voltage of 1500 volts across the separator plates to provide an electric field at right angles to or crosswise to the magnetic field which is perpendicular to the paper in FIG. 4. Thus, the magnetic field and the electric field define the E×B ion separator. The same permanent magnet is used to provide the magnetic field in the ion source and thus it is possible to reduce the system length as compared to other designs. Furthermore, in the present design, the permanent magnet is within the vacuum envelope. Thus, permanent magnetic field can be provided at very much lower cost than the customary external electromagnet. The magnetic field in the separator region has a value of 1100 gauss.

The main beam is indicated at 42 in FIG. 4. This beam has been analyzed, with impurity beams 41 and 43 being separated therefrom. Aperture plate 44 has analyzing opening 46 therein which permits the main beam to pass through to target holder 48. The target holder is preferably movable into the path of the beam, and may have an opening therein so that when the opening in the target holder is moved in line with the beam, the beam can pass through to faraday cup 50. By use of the cup, beam data can be obtained.

In a particular embodiment, the slit 30 through which the beam is extracted measures 1 inch by 0.020 inches. When the source is operating on argon or $BF_3$, with a ten KV extraction voltage, the total current is 2.5 milliamperes. When the gas is $BF_3$, operating under these conditions, 150 microamperes of boron is delivered through analyzing opening 46 to the target.

The ribbon shape of the beam is critical to this invention. In a ribbon shaped beam, a high beam current can be achieved with a narrow beam. The narrow beam configuration very much reduces the spreading of the beam due to space charge effects, as compared to a circular beam of the same current. Furthermore, in analyzing the beam, the impurities can be laterally deflected from the ribbon beam, but need only be deflected a small angle because the main beam can pass through an analyzing opening which is in the shape of an elongated slot, having generally the same proportions as the extraction slot at which the ions are extracted from the plasma. Thus, by using a beam which is taller than it is thick, and causing analyzing deflections of the impurities in the direction of the thickness direction, a high brightness, high flux density ion beam can be achieved by minimum spreading due to space charge effects and maximized analyzing.

This invention having been described in its preferred embodiment, it is clearly susceptible to numerous modifications and embodiments within the ability of those skilled in the art and without the exercise of the inventive faculty. Accordingly, the scope of this invention is defined by the scope of the following claims.

What is claimed is:

1. A high current separated ion source comprising:
   means for producing along a path a high aspect ratio substantially rectangular ribbon ion beam of substantially rectangular cross section and having a height and a thickness;
   magnetic field means for producing a magnetic field in the direction of the height of the beam across said path;
   first and second separator electrodes positioned on opposite sides of said path laterally of said path in the thickness dimension of the beam for applying an electric field across said path, said separator electrodes being positioned with respect to said magnetic field means so that said electric field is transverse with respect to said magnetic field to separate unwanted ion species laterally from the ion beam;
   said means for producing a ribbon ion beam comprising a cylindrical tubular cathode electrode and a central anode electrode therein, for defining a plasma discharge space within said cathode and around said anode which contains gas to be ionized and through which electrons pass to ionize the gas, said means for producing a magnetic field also producing a magnetic field in said discharge space to lengthen the electron path in said discharge space to produce a Penning discharge;
   walls defining a narrow rectangular slot opening in said cathode electrode through which ions are extracted to form the high aspect ratio substantially rectangular ribbon ion beam, said slot opening in said cathode electrode being oriented in a direction parallel to the axis of said cylindrical cathode; and
   an accelerator electrode positioned adjacent to the beam path to accelerate ions which have been extracted from said cathode slot along the beam path so that a separated ion beam having an ion current above 100 microamperes is formed.

2. The high current separated ion source of claim 1 further including an analyzer opening positioned downstream along the beam beyond said separator electrodes, said analyzer opening being an elongated slot positioned substantially parallel to said slot in said cathode electrode.

3. The high current separated ion source of claim 1 wherein an analyzer opening is positioned along the path of the ribbon ion beam downstream of said separator electrodes, said opening being slot shaped with the width of said slot being in a direction between said separator electrodes and the height of said slot being parallel to said electrodes.

* * * * *